(12) United States Patent
Dyl

(10) Patent No.: US 9,144,737 B2
(45) Date of Patent: Sep. 29, 2015

(54) SECURING GOAL-ACTIVATED GAME CONTENT

(75) Inventor: Christopher J. Dyl, Rehoboth, MA (US)

(73) Assignee: Turbine, Inc., Westwood, MA (US)

( * ) Notice: Subject to any disclaimer, the term of this patent is extended or adjusted under 35 U.S.C. 154(b) by 2137 days.

(21) Appl. No.: 10/633,062

(22) Filed: Aug. 1, 2003

(65) Prior Publication Data

US 2005/0026693 A1 Feb. 3, 2005

(51) Int. Cl.
*A63F 9/00* (2006.01)
*A63F 13/30* (2014.01)

(52) U.S. Cl.
CPC ........... *A63F 13/12* (2013.01); *A63F 2300/407* (2013.01); *A63F 2300/50* (2013.01); *A63F 2300/552* (2013.01); *A63F 2300/6009* (2013.01)

(58) Field of Classification Search
USPC ........................................................ 463/42
See application file for complete search history.

(56) References Cited

U.S. PATENT DOCUMENTS

| | | | | |
|---|---|---|---|---|
| 6,015,348 | A * | 1/2000 | Lambright et al. | 463/42 |
| 6,106,399 | A * | 8/2000 | Baker et al. | 463/42 |
| 6,227,966 | B1 * | 5/2001 | Yokoi | 463/1 |
| 6,253,167 | B1 * | 6/2001 | Matsuda et al. | 703/11 |
| 6,306,039 | B1 * | 10/2001 | Kaji et al. | 463/42 |
| 6,443,843 | B1 * | 9/2002 | Walker et al. | 463/42 |
| 6,482,087 | B1 | 11/2002 | Egozy et al. | 463/7 |
| 6,741,969 | B1 * | 5/2004 | Chen et al. | 705/14 |
| 6,767,287 | B1 * | 7/2004 | Mcquaid et al. | 463/42 |
| 6,951,516 | B1 * | 10/2005 | Eguchi et al. | 463/40 |
| 7,213,005 | B2 * | 5/2007 | Mourad et al. | 705/64 |
| 2002/0061743 | A1 | 5/2002 | Hutcheson et al. | 455/426 |
| 2002/0119822 | A1 * | 8/2002 | Kunzle et al. | 463/42 |
| 2002/0120667 | A1 * | 8/2002 | Nakano | 709/200 |
| 2003/0008712 | A1 | 1/2003 | Poulin | 463/42 |
| 2003/0037149 | A1 | 2/2003 | Hess | 709/227 |
| 2003/0087221 | A1 | 5/2003 | Sagar | 434/319 |
| 2003/0088523 | A1 * | 5/2003 | Yui | 705/400 |
| 2003/0109297 | A1 * | 6/2003 | Fukutome | 463/7 |
| 2006/0166744 | A1 * | 7/2006 | Igarashi et al. | 463/43 |

OTHER PUBLICATIONS

Editorial Preview by The Adrenaline Vault, "Spec Ops 2: Green Berets," http://www.avault.com/previews/preview_temp.asp?game=specops2&page=2 (3 pgs.) 2003.
Walsh, Ciaran, "Prisoner of War," http://www.music4games.net/f_powiv.html (3 pgs.).
Lynne, Bjorn, "Games That Use DirectMusic," http://www.freelists.org/archives/directmusic/07-2002/msg00008.html (2 pgs.) 2002.
Microsoft Corporation, "DirectMusic Producer Version 7.0: New Features for Creating Interactive Audio Content" http://msdn.microsoft.com/library/default.asp?url=library/en-us/dnmusic/html/dmp_7.asp (7 pgs.) 2000.

* cited by examiner

*Primary Examiner* — Seng H Lim
(74) *Attorney, Agent, or Firm* — Occhiuti & Rohlicek LLP

(57) ABSTRACT

Systems, methods, and data structures are described which allow limiting of dissemination of content in a multiplayer game, for example, limiting dissemination of goal-activated content in a massively multiplayer game (MPP).

20 Claims, 5 Drawing Sheets

SECURING GOAL-ACTIVATED GAME CONTENT

FIELD OF INVENTION

This invention relates generally to multiplayer computer games, and in particular, to methods for limiting dissemination of content to a client in a massively multiplayer game.

BACKGROUND

A massively multiplayer game ("MMP") is a computer game played by a large number of users through a communications network, which can be a local area network (e.g., Ethernet), a medium-area network (e.g., an intranet), or a wide-area network (e.g., the Internet). In addition, the communications network can be a wireless network, a cellular network or any other system which facilitates the transmission of data. In MMPs, humans and their avatars within the game ("players") are free to interact with other players as well as autonomous "non-player characters" which inhabit and are part of the game. Early examples of MMPs include games such as Ultima Online, EverQuest, and CrossGate.

Most MMPs are fantasy role-playing games ("RPGs") which take place within a mythical or mystical world. Most MMPs appear timeless, in that from the player's perspective they have no beginning and no end. New players can join a game in progress at any time, and do not need to wait for the start of a new game. In addition, many MMPs do not even define an absolute game endpoint, making the end of a game a logical impossibility. Thus, once a game has started, it can continue indefinitely. The players of that MMP are thereby involved in a continuing storyline akin to life within the real world. MMPs allow players to develop their avatars, form personal relationships with other players, and to enjoy social interaction through the reality of the game.

In order to make MMPs more immersive for their players, MMP creators constantly strive to provide a richer and more complete sensory interaction. To that end, MMP creators often develop content to be displayed to players as a reward for completing a challenging portion of the game. MMP creators may seek to limit the ways in which a player could view or disseminate such content. In this way, the MMP creators may attempt to ensure that the content is viewed only by a player completing the challenge.

Accordingly, new methods are needed to improve the ability of MMP creators to limit dissemination of content.

SUMMARY OF THE INVENTION

In satisfaction of this need, embodiments of the present invention provide methods and systems for limiting dissemination of goal-activated content in MMPs.

In accordance with one aspect of the invention, a method is provided for limiting dissemination of content in an online game. This method comprises hosting designated goal-activated content, transmitting goal-activated content at a client request, and instructing a client to delete locally stored goal-activated content.

In some embodiments, the transmission of goal-activated content is responsive to a player fulfilling a game goal.

In some embodiments, a history profile is received from the client. In one version of the invention, the instruction to delete goal-activated content is in accordance with the history profile.

In some embodiments, the goal-activated content is encrypted prior to being transmitted to the client.

In accordance with another aspect of the invention, a method is provided for limiting transmission of content transmitted by a server in an online game. This method comprises requesting goal-activated content from the server, receiving the goal-activated content, receiving an instruction from the server to delete the goal-activated content, and deleting the goal-activated content.

In some embodiments of the invention, the instruction to delete goal-activated content is received at initialization of an executable program.

In some embodiments, a history profile including information about content received from the server is maintained and sent to the server. In one version of the invention, the instruction to delete received from the server is in accordance with the history profile.

In some embodiments, the deletion instruction received from the server is an instruction to delete all goal-activated content.

In some embodiments, there is a determination that a game player has fulfilled a game goal. In one version, the request for goal-activated content is in response to the fulfillment of a game goal.

In accordance with another aspect of the invention, a method is provided for limiting transmission of content transmitted by a server to a client in an online game. This method comprises a client requesting goal-activated content from the server, a server transmitting the goal-activated content to the client, the server instructing the client to delete goal-activated content, and the client deleting the goal-activated content.

In some embodiments, the client determines that a game player has fulfilled a game goal, and the server authenticates that a game player has fulfilled a game goal. In one version, the client requesting goal-activated content is in response to the fulfillment of a game goal, and the server transmitting goal-activated content is in response to an authentication the game goal was fulfilled.

In some embodiments, the client maintains a history profile comprising information about content received from the server, and the client sends this history profile to the server. In one version, the server instructing the client to delete goal-activated content is in accordance with the history profile.

In some embodiments, the server instructs the client to delete all goal-activated content.

In some embodiments, the server instructs the client to delete goal-activated content at initialization of an executable program by the client.

In accordance with another aspect of the invention, a system is provided for limiting dissemination of content. Specifically, the system includes a non-volatile memory element, a transceiver, and a processor. The memory element stores goal-activated data. The transceiver receives connection requests from a remote client and transmits goal-activated content to the client. The transceiver further instructs the client to delete goal-activated content. The processor determines that goal-activated content is to be transmitted to the client.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION

The methods and systems to limit dissemination of content and efficiently provide content to a client in a MMP will now be described with respect to preferred embodiments; however, the methods and systems of the present invention are not limited to massively multiplayer games. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention.

While the content and nature of MMPs is the key to their widespread success, it is important to understand the technological underpinnings of a typical MMP. Although it is possible to host and play a computer game, and even an MMP, on a single computer, it is not preferred for MMPs. Accordingly, the following description of an exemplary system architecture is provided.

Figure 1:
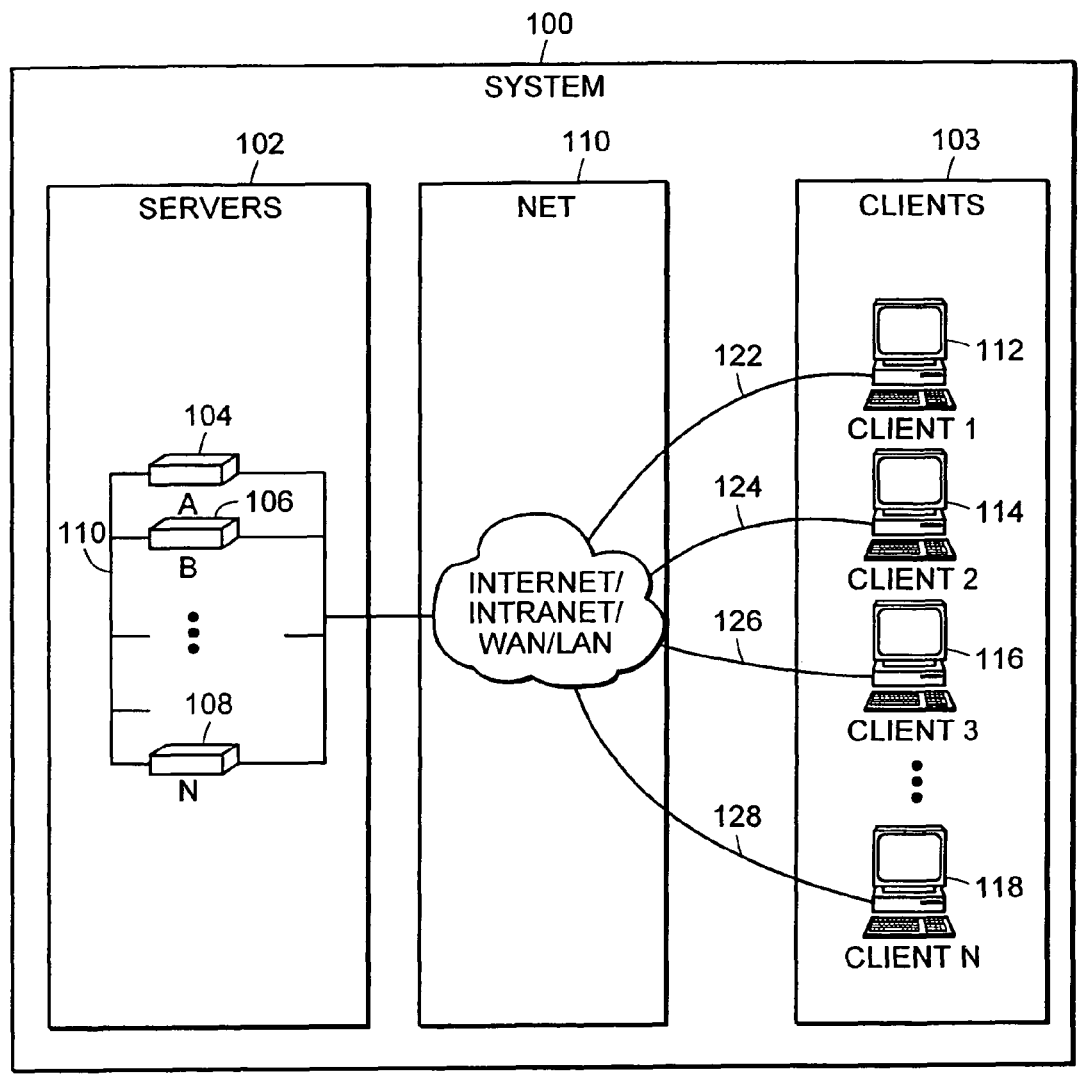
FIG. 1 illustrates a distributed computer system in accordance with one embodiment of the present invention.

FIG. 1 illustrates a distributed computer system 100 in accordance with one embodiment of the present invention.

The system 100 includes a server platform 102 and a client or player platform 103. The server platform 102 can include a plurality of individual servers 104, 106, 108. The client platform 103 can include a plurality of individual clients 112, 114, 116, 118. The number of clients is virtually limitless, constrained only by the physical characteristics of the server platform 102, client platform 103 and a communications network 110 connecting the two. As will be appreciated, the system 100 is a distributed virtual environment tailored to facilitate MMPs.

Each of the clients 112, 114, 116, 118 comprises a personal computer running client software which facilitates a player's operation of and interaction with the game. However, in other embodiments the clients 112, 114, 116, 118 may also comprise other devices, including but not limited to, cellular telephones (such as the Motorola Inc. A388c), wireless or palmtop computers (such as the Series 7 by Psion PLC), portable digital assistants (such as the Tungsten C by Palm Inc.), handheld game systems (such as the Gameboy Advance by Nintendo of America Inc.), game consoles (such as the Play Station 2 by Sony Corporation of America), etc.

Each client 112, 114, 116, 118 is generally responsible for displaying interacting objects (other players, terrain, non-player characters, etc.), displaying the game's interface, processing a player's inputs, playing music and sound and performing other CPU or bandwidth intensive operations.

Each of the servers 104, 106, 108 generally includes a computer system having a server platform portion of the game for communication, database storage, coordination, and overall control and administration of the game. The servers 104, 106, 108 generally maintain state information and coordinate client interaction with various objects in a virtual environment, including but not limited to other clients, vehicles, artificial intelligence, terrain, music and sound. Each server 104, 106, 108 provides additional functions, such as security, recording game goals and scoring and tracking each player's advancement towards those goals.

The clients 112, 114, 116, 118 communicate with the server platform 102 via the communication network 110. In the preferred embodiment, the communication network 110 depicted comprises the internet, but in other embodiments the communication network 110 could be an intranet, WAN or LAN, or any other type of network utilized for communicating between the server platform 102 and the client platform 103. For example, the communications network 110 could include, without limitation, a wireless network, a cellular network or any other system which facilitates the transmission of data. Each client 112, 114, 116, 118 has an associated communications link (or session) with one or more of the servers 104, 106, 108. As shown in FIG. 1, client 1 112 could communicate with server A 104 via a communications link 122. Similarly, client 2 114 could communicate with server B 106 via communications link 124. The servers 104, 106, 108 are interconnected via a communications network 110. In the embodiment shown in FIG. 1, the communications network 110 is depicted as a dedicated network, but could also be a shared network such as the Internet.

During operation of the system 100, a particular client, for example client 1 112, which desires to enter the game communicates through a communications link 122 with an allocated server A 104. The determination of which specific server 104, 106, 108 a particular client is linked with will depend on a number of parameters, such as server load, number of clients, location of clients, status of client (e.g., position) within the game itself, and other parameters as are known to those skilled in the art. In the particular embodiment shown in FIG. 1, the number of servers 104, 106, 108 needed for allocation depends upon the number of clients. FIG. 1 illustrates operation of the system 100 when a large number of clients 112, 114, 116, 118 are logged onto a plurality of servers 104, 106, 108.

When there are relatively few clients 103 participating in the game, only one server is typically needed to serve the clients 103. During game operation, there is often no need for direct communication between clients. The server platform 102 communicates with each client its positional, status and event data (referred to as client or player data, or as a player's attributes) for every other player and object the client can see or interact with inside the virtual environment of the game. Such player data includes, but is not limited to, avatar attributes, type, physics modeling, scoring, position, orientation, motion vector, animation, background music, player music, inventory, vehicle, call sign, or other client or object attributes necessary for the particular game. Typically, the server includes a database of information that is maintained and updated as the players interact within the game. Through the interaction between the client platform 103 and the server platform 102, the game is facilitated.

Figure 2:
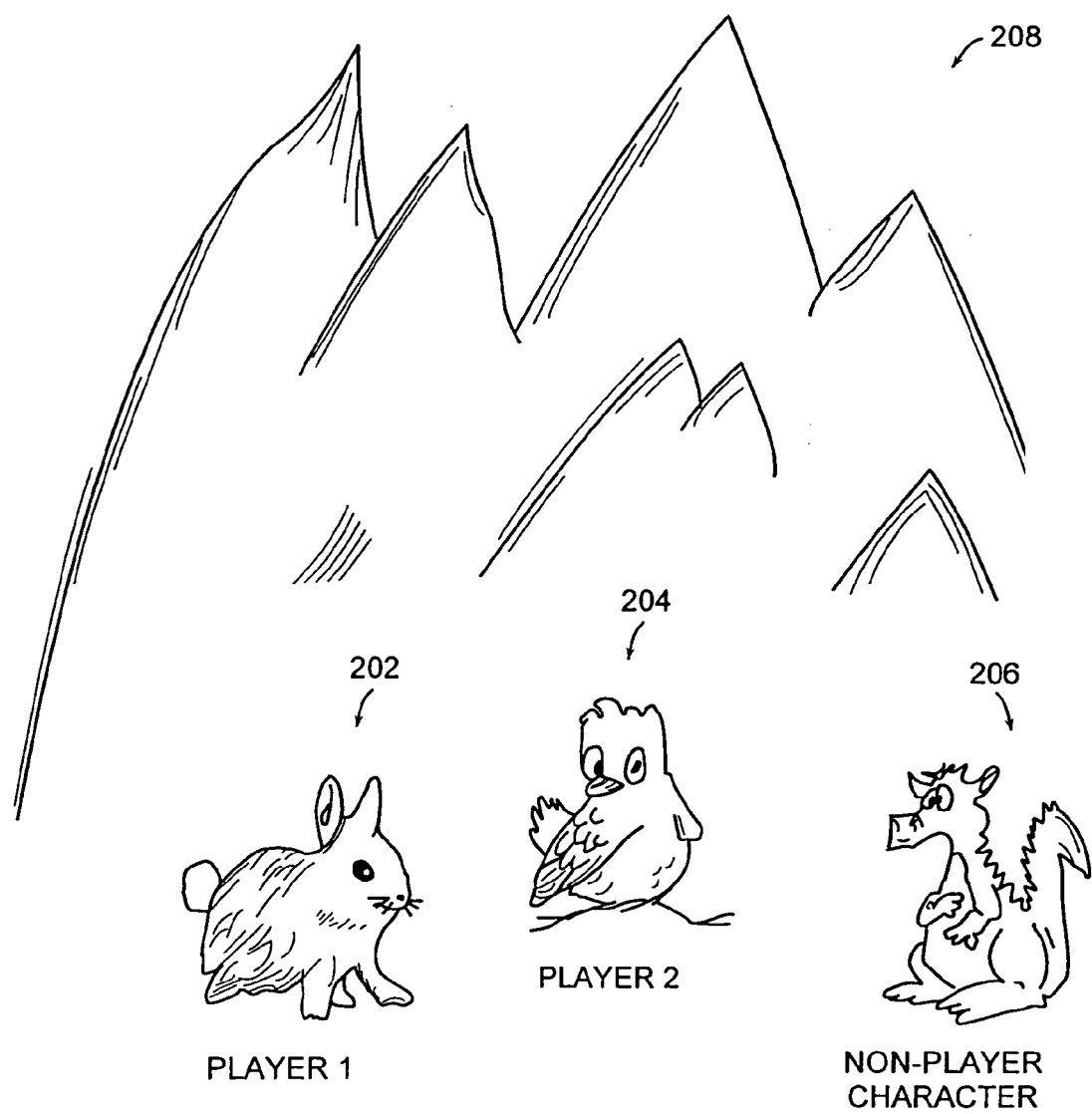
FIG. 2 depicts a typical scene within the virtual environment of the game.

FIG. 2 depicts typical content that is represented within the virtual environment of one embodiment of an MMP. As illustrated in FIG. 2, a number of objects are present within the scene. In the embodiment shown in FIG. 2, a small rabbit 202 (the "bunny"), a young bird 204 (the "chick") and a dragon 206 are present. The bunny 202, the chick 204 and the dragon 206 are located with a mountain range context 208. The client must process the content describing the bunny 202, the chick 204, the dragon 206, the mountain range 208, along with information about how they are to be displayed on the player's screen. The client may also need to display additional content, such as, for example, audio files, graphics files, and multi-media files.

In order to be processed and displayed by the client, content must somehow be placed at the client. Some content may be placed at the client without any server interaction in an off-line process, such as when a player loads a game program and associated content onto the client from a CD-ROM. Other content may be placed at the client in a communication outside of a program execution, such as when a client initializes a connection with a server and the server then transmits content. Still other content may be placed at the client via a communication with a server that takes place during a program execution, such as when the client has already established a connection with a server and is executing a program that requires additional content to be fetched from the server.

Content may be designated as "goal-activated" content, in accordance with a preferred embodiment of the invention. Goal-activated content may be transmitted from a server to the client during execution of a program on the client (i.e., at "runtime"). It may be desirable to designate content as goal-activated content when, for example, the content is secret. In such a case, it may be desirable for this content to remain off the client until it becomes necessary for the client to access the content. For example, suppose the client is executing a program containing a game challenge for a player. When the player completes the challenge, a secret movie appears. If the secret movie resides on the client, a savvy player could inspect the locally stored game files to view the secret movie without having completed the challenge. It may be preferable, in such a case, to designate the secret movie as goal-activated content, so the secret movie is transmitted to the client only when a player successfully completes the challenge. Moreover, it may be desirable to remove the secret movie from the client once it has been viewed by the player, thus preventing the player from transmitting the secret movie to other players who have not completed the challenge.

Figure 3:
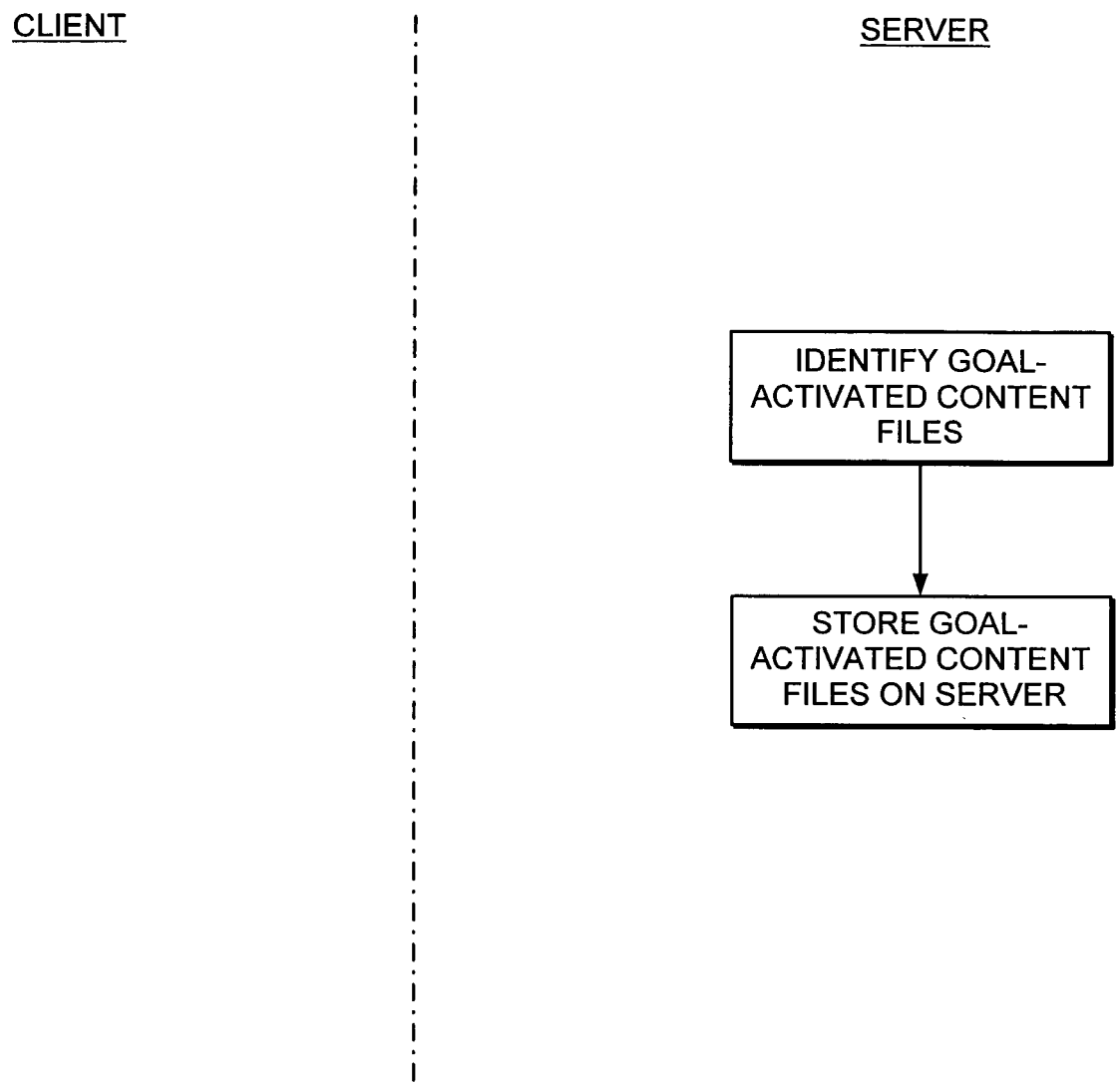
FIG. 3 is a flow chart which illustrates the identification of goal-activated content in accordance with one embodiment of the invention.

FIG. 3 is an illustration of goal-activated content being identified and stored on the server. Goal-activated content may be identified during the development process, prior to production and distribution of the program. This ensures that the client does not have access to the goal-activated content until that time when it is transmitted from the server during program execution.

Figure 4:
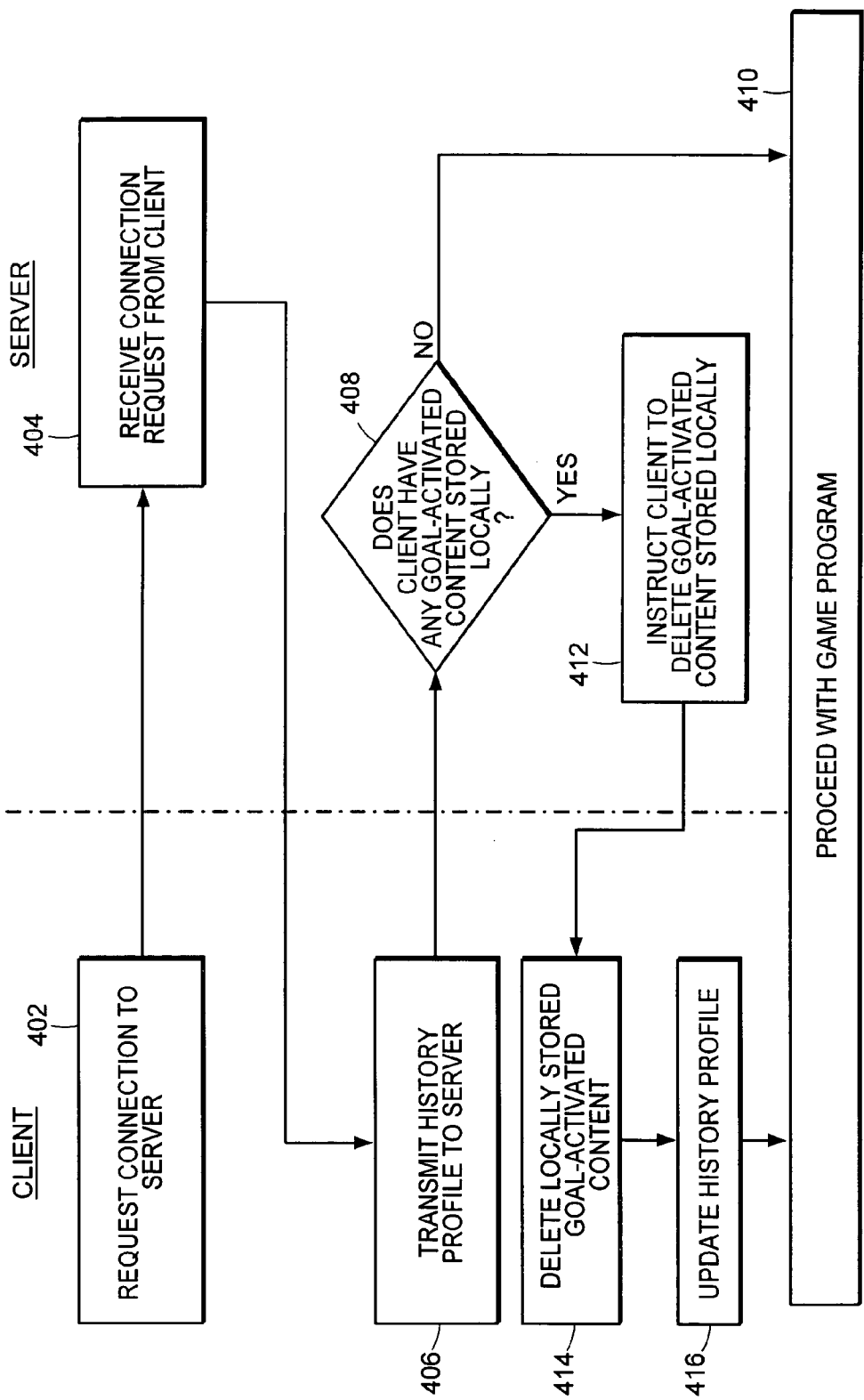
FIG. 4 is a flow chart which illustrates the deletion of goal-activated content from the client at initialization in accordance with one embodiment of the invention.

FIG. 4 illustrates a process by which goal-activated content is deleted from a client, in accordance with a preferred embodiment of the invention. Upon initialization of a program execution at the client, the client requests a network connection to the server in a connection request step 402. The server receives this request in a request reception step 404 and proceeds to authenticate the client. The client then transmits to the server a history profile in a profile transmission step 406. Once the server receives the history profile, it determines if the client has any goal-activated content stored locally in a determination step 408. If no goal-activated content is present at the client, the game program continues in a continuation step 410. If goal-activated content is present at the client, the server instructs the client to delete goal-activated content stored at the client in a deletion instruction step 412. After receiving the instruction, the client deletes locally stored goal-activated content in a deletion step 414, according to the instruction received. The client also updates its history profile in an updating step 416 to reflect that it no longer has the locally stored goal-activated content. The game program then continues in continuation step 410.

With reference to profile transmission step 406, the history profile may be a file stored on the client, comprising a list of data files presently stored at the client along with version information for those data files. In one embodiment, the history profile comprises an iteration number representing the version of the content most recently obtained by the client. In another embodiment, the history profile includes a list of goal-activated content previously transmitted by server and currently stored at the client. Alternatively, the history profile includes an indicator bit, which is, for example, set to 0 if there is no goal-activated content at the client, and set to 1 if there is any goal-activated content at the client.

With reference to deletion instruction step 412, in one embodiment, the server gives specific instructions to delete precisely that goal-activated content listed in the history profile. In another embodiment, the server gives a global instruction to delete all goal-activated content stored at the client.

In another preferred embodiment of the invention, no history profile is used in the procedure to delete goal-activated content. Instead, the server instructs the client to delete any locally stored goal-activated content, without first determining if any goal-activated content is present at the client. With reference to FIG. 4, this could be accomplished by omitting steps 406 and 416 omitted, and assuming there is goal-activated content stored locally at the client in step 408.

Alternatively, the client may use this history profile as an internal reference of locally stored goal-activated content. In this embodiment, the client always receives a global instruction to delete all locally stored goal-activated content. The client must update the history profile after deleting goal-activated content.

Figure 5:
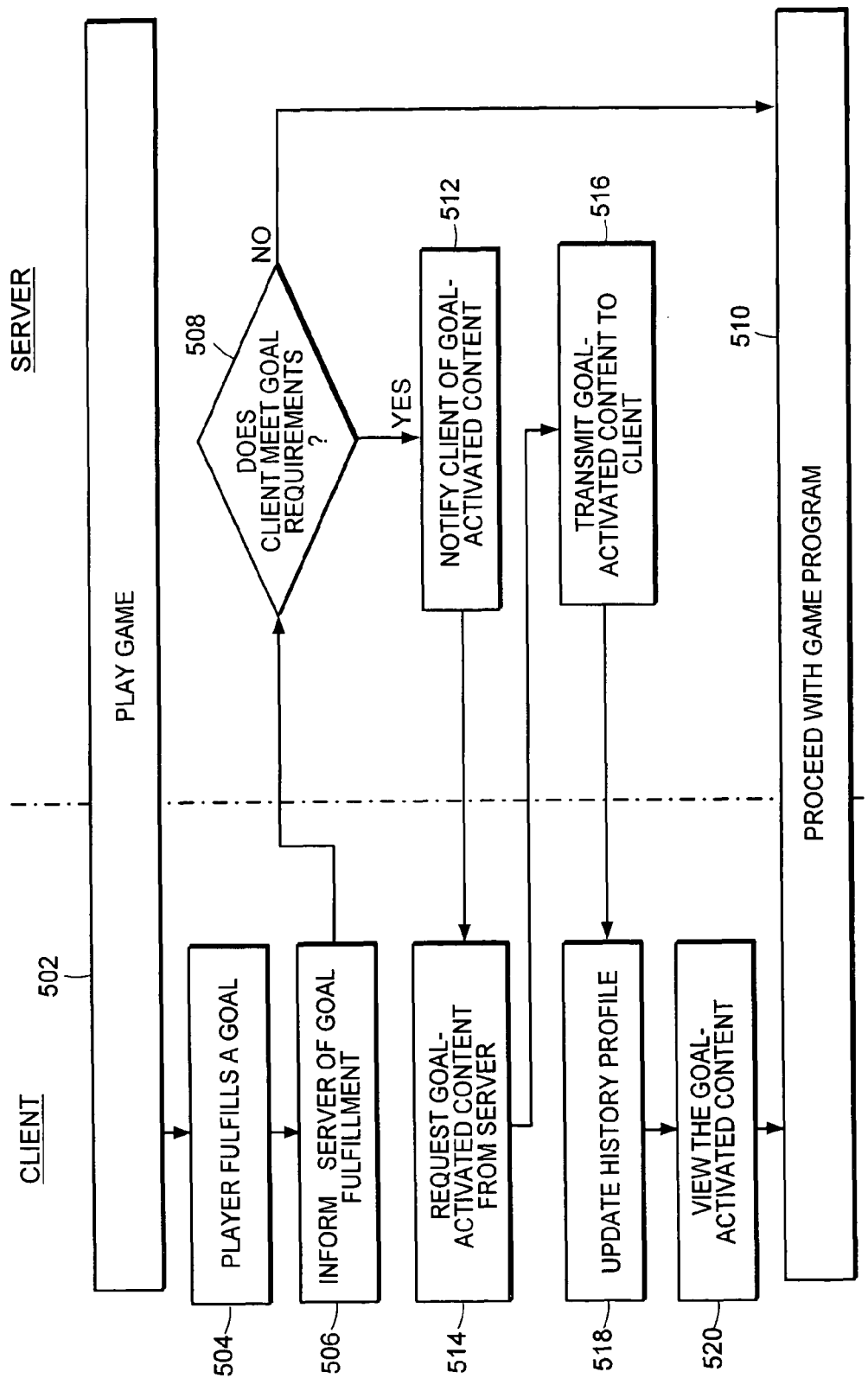
FIG. 5 is a flow chart which illustrates the transmission of goal-activated content from server to client in accordance with one embodiment of the invention.

FIG. 5 illustrates a process by which goal-activated content is transmitted to a client, in accordance with a preferred embodiment of the invention. The process begins with a game playing step 502 in which the client and server interact while a player associated with the client plays the game. Game play typically comprises a variety of goals and quests to be fulfilled by the player. The player fulfills a goal in a fulfillment step 504. The client, with which the player is associated, then informs the server that the goal has been fulfilled in an informing step 506. Some goals have associated with them goal-activated content to be displayed by the client. The server determines if the player associated with the client has met the goal requirements in a determination step 508. If the client has not actually met the goal requirements, then game play continues in a continuation step 510. The determination step 508 thus helps ensure that goal-activated content is not transmitted to clients who may be attempting to trick the system by pretending to have fulfilled a goal.

If the server determines that all the goal requirements are indeed met, the server informs the client that there is goal-activated content associated with the fulfilled goal in a notification step 512. The client then requests the associated goal-activated content from the server in a requesting step 514. The server transmits the associated goal-activated content to the client in a transmission step 516. In one embodiment of the invention, the server encrypts the goal-activated content using a known encryption algorithm before transmitting it to the client, who later decrypts the goal-activated content in order to display it. The client updates its history profile to reflect the receipt of the goal-activated content in a profile updating step 518. Updating the history profile facilitates later deletion of the goal-activated content, as described with reference to FIG. 4, in accordance with a preferred embodiment of the invention. After the goal-activated content has been transmitted to the client, the goal-activated content is viewed on the client in a viewing step 520. Alternatively, the goal-activated content may be viewed by the client in a streaming fashion, so that the viewing step 520 takes place concurrently with the goal-activated content being transmitted to the client. Game play then continues with continuation step 510.

The present invention can be provided as one or more computer-readable programs embodied on or in one or more articles of manufacture. The article of manufacture can be a floppy disk, a hard disk, a CD ROM, a flash memory card, a PROM, a RAM, a ROM, or a magnetic tape. In general, the computer-readable programs can be implemented in any programming language. Some examples of languages that can be used include C, C++, or JAVA. The software programs can be stored on or in one or more articles of manufacture as object code.

In this fashion, embodiments of the present invention limit the dissemination of goal-activated content within a massively multiplayer game. It will be appreciated by those skilled in the art that various omissions, additions and modifications can be made to the methods and systems described above without departing from the scope of the invention, and all such modifications and changes are intended to fall within the scope of the invention, as defined by the appended claims.

The invention claimed is:

1. A method for limiting dissemination of multi-media content in an online game, the method comprising: at a server, hosting, for transmission, multi-media content designated as goal-activated content for an online game;
   receiving information indicating that a plurality of players is playing the online game on each of a corresponding plurality of clients,
   receiving information indicating that a first player from the plurality of players has completed a game challenge associated with the goal-activated content,
   in response to receiving the information indicating that a first player from the plurality of players has completed a game challenge associated with the goal-activated content, transmitting the goal-activated content to a first client associated with the first player; and
   instructing the first client to delete the goal-activated content stored on the first client, thereby hindering said first player from providing said goal-activating content to a player who has not completed the game challenge,
   wherein the server comprises a processor in data communication with a memory, and wherein the client comprises a processor in data communication with a memory.

2. The method of claim 1, wherein transmitting the goal-activated content comprises transmitting the goal-activated content to the first client in response to a determination that the first player completed the game challenge.

3. The method of claim 1, further comprising receiving a history profile from the first client.

4. The method of claim 3, wherein instructing the first client to delete the goal-activated content comprises instructing the first client to delete goal-activated content stored on the first client in accordance with the history profile.

5. The method of claim 1, further comprising encrypting the goal-activated content prior to transmission to the first client.

6. A method for limiting dissemination of multi-media content transmitted by a server in an online game, the method comprising:
   transmitting, to the server, information indicating that a player has completed a challenge from the on-line game;
   requesting multi-media content designated as goal-activated content from the server;
   receiving the goal-activated content from the server;
   receiving an instruction from the server to delete the goal-activated content; and
   deleting the goal-activated content, thereby hindering said first player from providing said goal-activating content to a player who has not completed the game challenge,
   wherein the server comprises a processor in data communication with a memory, and wherein the client comprises a processor in data communication with a memory.

7. The method of claim 6, wherein receiving an instruction from the server to delete goal-activated content comprises receiving, upon initialization of an executable program, an instruction to delete the goal-activated content.

8. The method of claim 6, further comprising maintaining a history profile having information about content received from the server and sending the history profile to the server.

9. The method of claim 8, wherein receiving an instruction from the server to delete goal-activated content comprises receiving an instruction to delete the goal-activated content in accordance with the history profile.

10. The method of claim 6, wherein receiving an instruction from the server to delete goal-activated content comprises receiving an instruction to delete all goal-activated content.

11. The method of claim 6, further comprising determining that a player has fulfilled a goal.

12. The method of claim 11, wherein requesting goal-activated content from the server comprises requesting goal-activated content in response to the completion of the game challenge.

13. A method for limiting dissemination of multi-media content transmitted by a server to a client in an online game, the method comprising:
   at the server, designating selected multi-media content as goal-activated content;
   transmitting the goal-activated content to the client over a network; and
   transmitting to the client, over the network, instructions to delete the goal-activated content so that the instructions, when executed, hinder delivery of the goal-activated content to a player who has not completed a game challenge associated with the goal-activated content,
   wherein the server comprises a processor in data communication with a memory, and wherein the client comprises a processor in data communication with a memory.

14. The method of claim 13, further comprising authenticating completion of the challenge by a player associated with the client.

15. The method of claim 14, wherein transmitting the goal-activated content comprises transmitting the goal-activated content to the client in response to the authentication.

16. The method of claim 13, further comprising receiving a history profile maintained by the client, the history profile including information about goal-activated content received from the server.

17. The method of claim 16, wherein instructing the client to delete the goal-activated content comprises instructing the client to delete goal-activated content in accordance with the history profile.

18. The method of claim 13, wherein instructing the client to delete the goal-activated content comprises instructing the client to delete all goal-activated content stored on the client.

19. The method of claim 13, wherein instructing the client to delete the goal-activated content comprises instructing the client to delete all goal-activated content upon initialization of an executable program by the client.

20. A computer-based multi-media content dissemination-limiting apparatus comprising:
- a non-volatile memory element storing data representative of multi-media content designated as goal-activated content;
- a transceiver for receiving a connection request from a remote client on a network; and
- a processor configured for
  - determining that the goal-activated content is to be transmitted to the client;
  - causing the transceiver to transmit the goal-activated content to the client; and
  - causing the transceiver to transmit a deletion instruction for deleting the goal-activated content from the client thereby hindering those who have not completed a game challenge associated with the goal-activated content from receiving the goal-activated content.

* * * * *